United States Patent [19]

Ikeura

[11] 4,367,711

[45] Jan. 11, 1983

[54] METHOD AND APPARATUS FOR IGNITION SYSTEM SPARK TIMING CONTROL WITHIN WARM-UP PERIOD OF THE ENGINE

[75] Inventor: Kenji Ikeura, Yokosuka, Japan

[73] Assignee: Nissan Motor Co., Ltd., Yokohama, Japan

[21] Appl. No.: 136,959

[22] Filed: Apr. 3, 1980

[30] Foreign Application Priority Data

Apr. 16, 1979 [JP] Japan .................................. 54-45327

[51] Int. Cl.³ .......................................... F02P 5/04
[52] U.S. Cl. ..................................... 123/417; 123/421
[58] Field of Search ................ 123/416, 417, 421, 424

[56] References Cited

U.S. PATENT DOCUMENTS

| | | | |
|---|---|---|---|
| 3,749,073 | 7/1973 | Asplund | 123/416 |
| 3,853,103 | 12/1974 | Wahl et al. | 123/146.5 A X |
| 3,898,894 | 8/1975 | Aono et al. | 123/421 X |
| 3,969,614 | 7/1976 | Moyer et al. | 123/416 X |
| 3,978,833 | 9/1976 | Crall et al. | 123/416 |
| 4,009,699 | 3/1977 | Hetzler et al. | 123/416 |
| 4,015,565 | 4/1977 | Aono et al. | 123/416 |
| 4,081,995 | 4/1978 | Griffith et al. | 123/416 X |
| 4,127,091 | 11/1968 | Leichle | 123/416 |
| 4,162,666 | 7/1979 | Maioglio | 123/416 |
| 4,204,256 | 5/1980 | Klotzner | 123/416 |
| 4,314,540 | 2/1982 | Ikeura | 123/417 X |

FOREIGN PATENT DOCUMENTS

| | | |
|---|---|---|
| 1432084 | 4/1976 | United Kingdom ................ 123/416 |
| 1458275 | 12/1976 | United Kingdom . |
| 1537532 | 12/1978 | United Kingdom . |
| 1543963 | 4/1979 | United Kingdom . |
| 1548039 | 7/1979 | United Kingdom . |
| 2006988 | 5/1979 | United Kingdom . |

*Primary Examiner*—Tony M. Argenbright
*Attorney, Agent, or Firm*—Lane, Aitken, Kice & Kananen

[57] ABSTRACT

A method and apparatus for controlling ignition system spark timing. Engine temperature is sensed and a basic value of spark advance is determined by calculation based upon the engine operating parameters excluding the engine temperature. This basic value of spark advance is corrected by a central processor in accordance with the sensed engine temperature.

4 Claims, 8 Drawing Figures

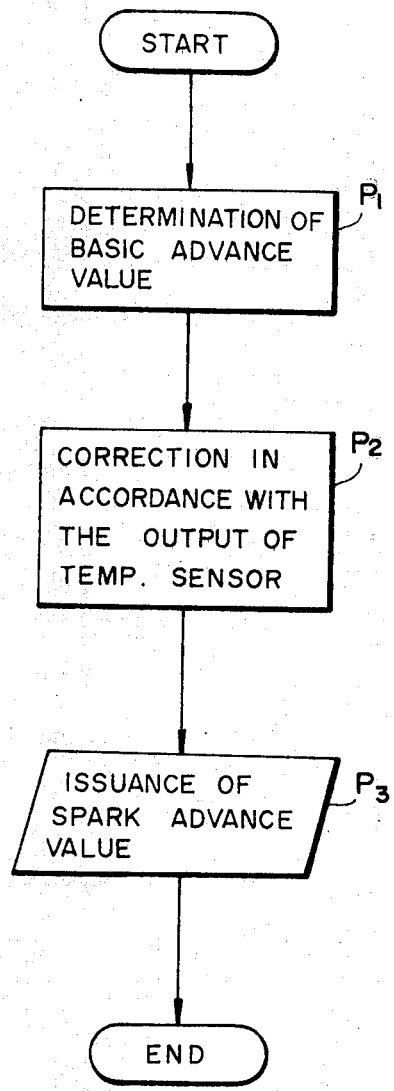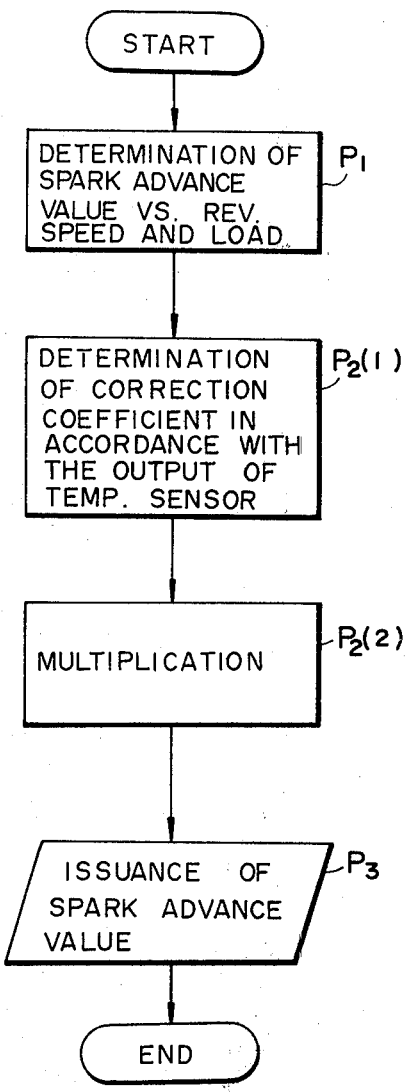

METHOD AND APPARATUS FOR IGNITION SYSTEM SPARK TIMING CONTROL WITHIN WARM-UP PERIOD OF THE ENGINE

CROSS-REFERENCES TO RELATED APPLICATIONS

References are made to the following related copending applications, each filed in the name of Kenji Ikeura on Apr. 3, 1980: (1) U.S. patent application Ser. No. 137,001; (2) U.S. patent application Ser. No. 137,000; (3) U.S. patent application Ser. No. 136,996; (4) U.S. patent application Ser. No. 136,994, now U.S. Pat. No. 4,314,540.

BACKGROUND OF THE INVENTION

The present invention relates to a method and apparatus for the control of an ignition system spark timing for a spark ignition internal combustion engine, and more particularly to a method and apparatus for the control of an ignition system spark timing within a warm-up period of the engine.

Description is now provided concerning the conventional art and the problems associated therewith. The spark timing control system for an internal combustion engine adjusts the timing of a spark to a certain degree before the top dead center (for example, 12° BTDC/600 rpm) so as to cause the ignition to take place at the optimum instance to provide the maximum output because there is an ignition delay from the passage of a spark to an actual ignition of the fuel within the cylinder of the engine. The ignition delay in terms of time is substantially unchanged even if the engine revolution speed increases, but if it is considered in terms of crank angle, the ignition delay increases in accordance with an increase in the engine revolution speed because the piston speed increases in accordance with the increase in engine revolution speed. Thus, a centrifugal spark advance controller of the mechanical type, for example, is operatively connected to a distributor, thereby to advance the spark timing in accordance with an increase in the revolution speed because if the spark timing remains at the same level as that for the low revolution speed, an adequate output characteristic can not be provided when the speed increases.

FIG. 1 is a graph showing one example of a spark advance characteristic provided by the conventional centrifugal advance controller, wherein the axis of abscissa designates the engine revolution speed and the axis of ordinate indicates the spark advance value. The letter $N_1$ designates a revolution speed beyond or above which the spark advance value increases, the letter $N_2$ designates a revolution speed beyond or above which the spark advance value becomes maximum, the solid line designates the spark advance characteristic when the engine temperature is within its ordinary-in-use range, and the broken line designates the spark advance characteristic when the engine is within a low temperature range. This is often called a "two-point method" which is characterized by a selective use of two separate spark advance characteristics by switching in response to the low engine temperature range or the ordinary-in-use engine temperature range.

Induction vacuum as the engine is operating has a great influence on the ignition delay. Namely, since when the induction vacuum is great, i.e., when the throttle valve opening degree is small, the rate of residual gas within a cylinder is great and thus the density of fresh air fuel charge is low within the cylinder, thereby to cause a reduction in flame propagation, causing a drop in performance. As a countermeasure to this, it has been the conventional practice to provide a distributor with a vacuum spark advance controller.

FIG. 2 is a graph showing one example of a spark advance characteristic provided by the conventional vacuum advance controller, wherein the axis of abscissa designates the induction vacuum, the axis of ordinate designates the spark advance angle, the solid line designates the spark advance characteristic to be used when the engine temperature is within the ordinary-in-use temperature range, and the broken line designates the advance characteristic to be used when the engine temperature is especially low. The characteristic designated by the broken line shows that spark advance control due to induction vacuum is suspended during low engine temperature.

However, the conventional mechanical spark timing controls of the above mentioned types have the following problems. That is, in the case of the two point centrifugal spark advance controller which provides the two-stage spark advance characteristic as shown by the solid and broken lines in FIG. 1, it is necessary to effect switching in response to the temperature and it requires the addition of a point change unit, thus causing an increase in cost and a drop in reliability. Besides, since what is allowed by the characteristic is a parallel shift from one to the other only and thus a limited freedom, the problem of poor driveability cannot be completely solved with this limited freedom. At the same time, in the case wherein the spark advance control by the induction vacuum is suspended when the engine temperature is low, the spark advance value becomes very small when the engine temperature is low and there occurs a great difference between the spark advance when the vacuum control is effective and the spark advance when the vacuum control is suspended, thus resulting in poor driveability and fuel economy.

Recently, electronic spark timing controls have been developed which employ a digital processor, such as a microcomputer, to determine the optimum spark advance value in accordance with the engine revolution speed and load, and the electronic spark timing controls of the above type feature that the optimum spark timing suitable for every operating condition of the engine can be easily set, thus making a contrast to the conventional mechanical spark advance controller, such as centrifugal spark advance mechanism or vacuum spark advance mechanism.

SUMMARY OF THE INVENTION

An object of the present invention is to provide the optimum value of a spark advance in accordance with a varying warm-up state of the engine. The method and apparatus provide the control wherein a digital processor is used to effect correction such that the value of a spark advance varies smoothly in accordance with the warm-up state of a spark-ignition internal combustion engine when the engine temperature is low.

The method and apparatus of the invention concerns the control wherein engine temperature is sensed, and a value of spark advance that is determined by calculation based upon engine operating parameters excluding the engine temperature is corrected in accordance with the sensed engine temperature.

Another aspect of the invention is in that a correction coefficient for the sensed engine temperature is found by calculation or table look-up; the value of spark advance that is determined by calculation based upon engine operating parameters excluding the sensed engine temperature with the correction coefficient to provide a result; and said result is provided as an output value of spark advance.

Still another aspect of the invention is in that the value of maximum spark advance for the sensed engine temperature is found by calculation or table look-up; the value of spark advance that is determined by calculation based upon engine operating parameters excluding the sensed engine temperature is compared with said value of maximum spark advance; and said value of maximum spark advance is provided as an output value of spark advance when the value of spark advance that is determined by calculation based upon the engine operating parameters excluding the sensed engine temperature is greater than the value of maximum spark advance.

Still another aspect of the invention is in that the value of spark advance when the engine is within a relatively low temperature range within a warm-up period is smaller than the value of spark advance when the engine is within a relatively high temperature range after the warm-up period.

The invention may be better understood by reference to the detailed description which follows and to the drawings.

BRIEF DESCRIPTION OF THE DRAWINGS

FIGS. 4 and 5 are flow charts illustrative of the operation of the central processor used to determine the value of spark advance;

DETAILED DESCRIPTION OF THE INVENTION

Figure 1:
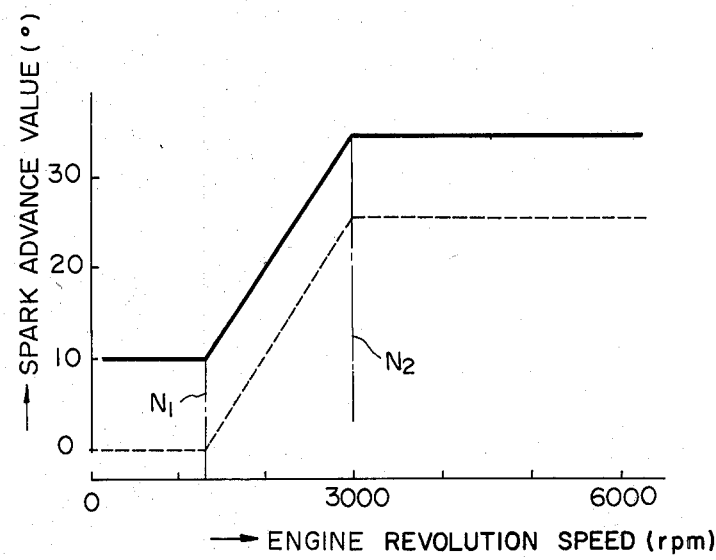
FIG. 1 is a graph of engine-speed spark-advance versus engine speed according to the conventional art.
Figure 2:
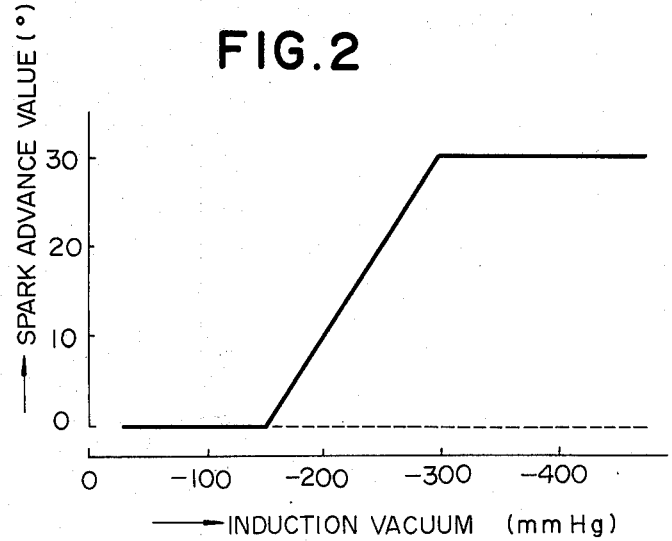
FIG. 2 is a graph of induction-vacuum spark-advance versus induction vacuum according to the conventional art.
Figure 3:
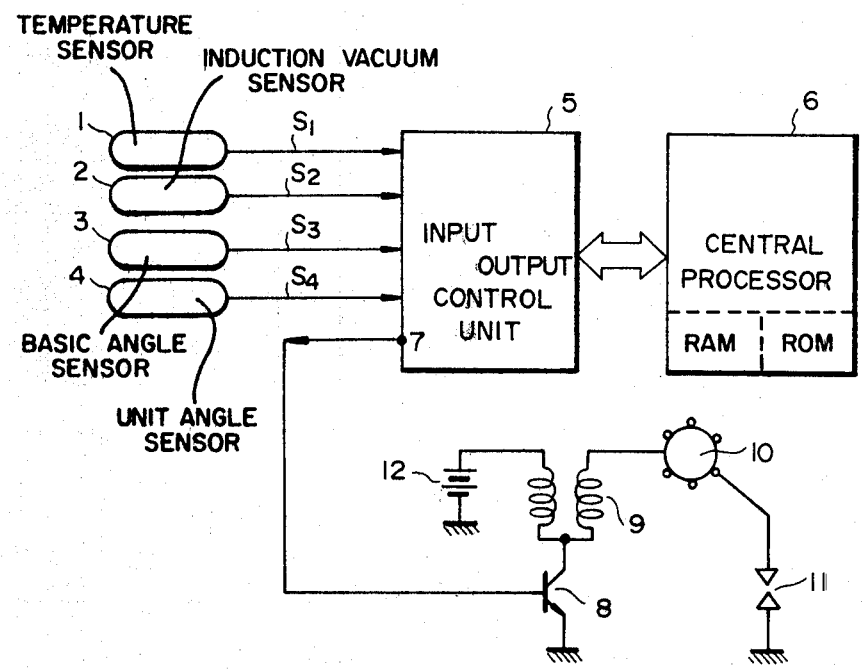
FIG. 3 is a block diagram illustrating one embodiment of the invention.

FIG. 3 is a block diagram showing a preferred embodiment of the present invention. In FIG. 3, the reference numeral 1 designates a temperature sensor which provides a signal $S_1$ representing engine coolant temperature, numeral 2 designates an induction vacuum sensor which provides an induction vacuum signal $S_2$ representing induction vacuum, numeral 3 designates a basic angle sensor which provides basic angle pulse signals $S_3$ each upon expiration of a basic angle (for example 120°) as the crank shaft rotates, and the numeral 4 designates an unit angle sensor which provides unit angle pulse signals $S_4$ each upon expiration of an unit angle (for example 1°) as the crank shaft rotates. Engine revolution speed is determined by processing the signal $S_4$ from the unit angle sensor 4. These signals $S_1$ to $S_4$ (if necessary, signals including a signal corresponding to an idle condition of the engine, a fuel injection pulse signal and/or a gear position signal may be used) are read in via an input-output control unit 5 that is constructed of semiconductors by a central processor 6 including a ROM (read only memory), a RAM (random access memory), and a CPU (central processor unit). Central processor 6 finds the revolution speed and load of the engine from the signals $S_2$, $S_3$, $S_4$ among all of the read in signals, determines a spark advance value A for the revolution speed and load by calculation or table look-up, and instructs K·A the value made by multiplying the spark advance value by a correction coefficienty k that corresponds to signal $S_1$ from temperature sensor 1, to that section of input-output control unit 5 which performs the spark advance control. Input-output control unit 5 provides, at a spark output terminal 7, the instructed spark advance value k·A in accordance with timing decided based upon the basic angle pulse signal $S_3$ and the unit angle pulse signal $S_4$, thus controlling operation of a transistor 8 which turns on or off electric current passing through an ignition coil 9 of an ignition circuit. The reference numeral 10 designates a distributor, numeral 11 designates a spark plug, and numeral 12 designates a battery for an electric source.

Referring to the way to determine the correction coefficient k, it is preferred to find the correction coefficient by table look-up of the optimum values of correction coefficient stored in memory, for various values of the output signal $S_1$ of the temperature sensor 1. However, if the capacity for program and memory is restricted, it is possible to find the correction coefficient by calculation based on the signal $S_1$.

Figure 6:
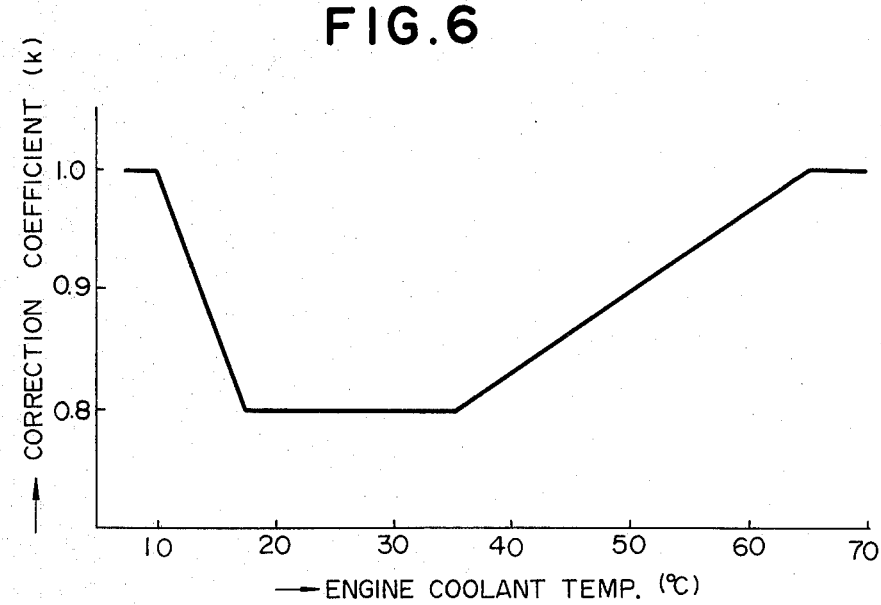
FIG. 6 is a graph of correction coefficient versus engine coolant temperature.

FIGS. 4 and 5 are flow charts illustrative of the operation of the central processor 6 up to the output of a spark advance value. Referring to FIG. 4, when the program starts, a basic spark advance value is found in accordance with the engine revolution speed and load in a step $P_1$, the basic spark advance value is corrected in response to the output of the temperature sensor in the subsequent step $P_2$, and finally the spark advance value having been corrected is produced in a step $P_3$, ending a process routine for spark advance value determination. Putting it more concretely, as shown in a flow chart of FIG. 5, in step $P_1$ a two-dimensional table look-up versus the engine revolution speed and load is carried out to find a basic spark advance value. In the subsequent step $P_{2(1)}$, a one-dimensional table look-up versus the output signal $S_1$ of the temperature sensor 1 is carried out to find a correction coefficient k. In the subsequent step $P_{2(2)}$, multiplication of the basic spark advance value by the correction coefficient is carried out, and finally the result of multiplication k·A is produced as the final spark advance value from the step $P_3$. FIG. 6 is a graph showing one example of the correction coefficient, wherein the axis of abscissa shows the engine coolant temperature and the axis of ordinate the correction coefficient k.

As a means for detecting the temperature condition of the engine, a temperature sensor to detect engine coolant temperature is appropriate from the view point of common-in-use of information. However, if placing an emphasis on engine start-up performance, it is also possible to use a sensor to detect cylinder wall temperature or a sensor to detect oil temperature.

Figure 8:
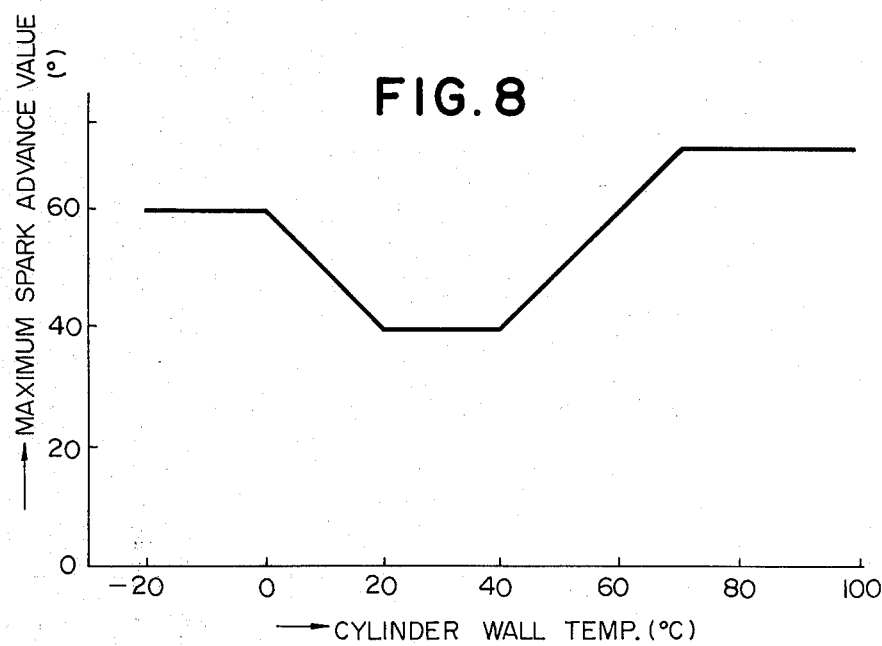
FIG. 8 is a graph of maximum spark advance versus cylinder wall temperature.
Figure 7:
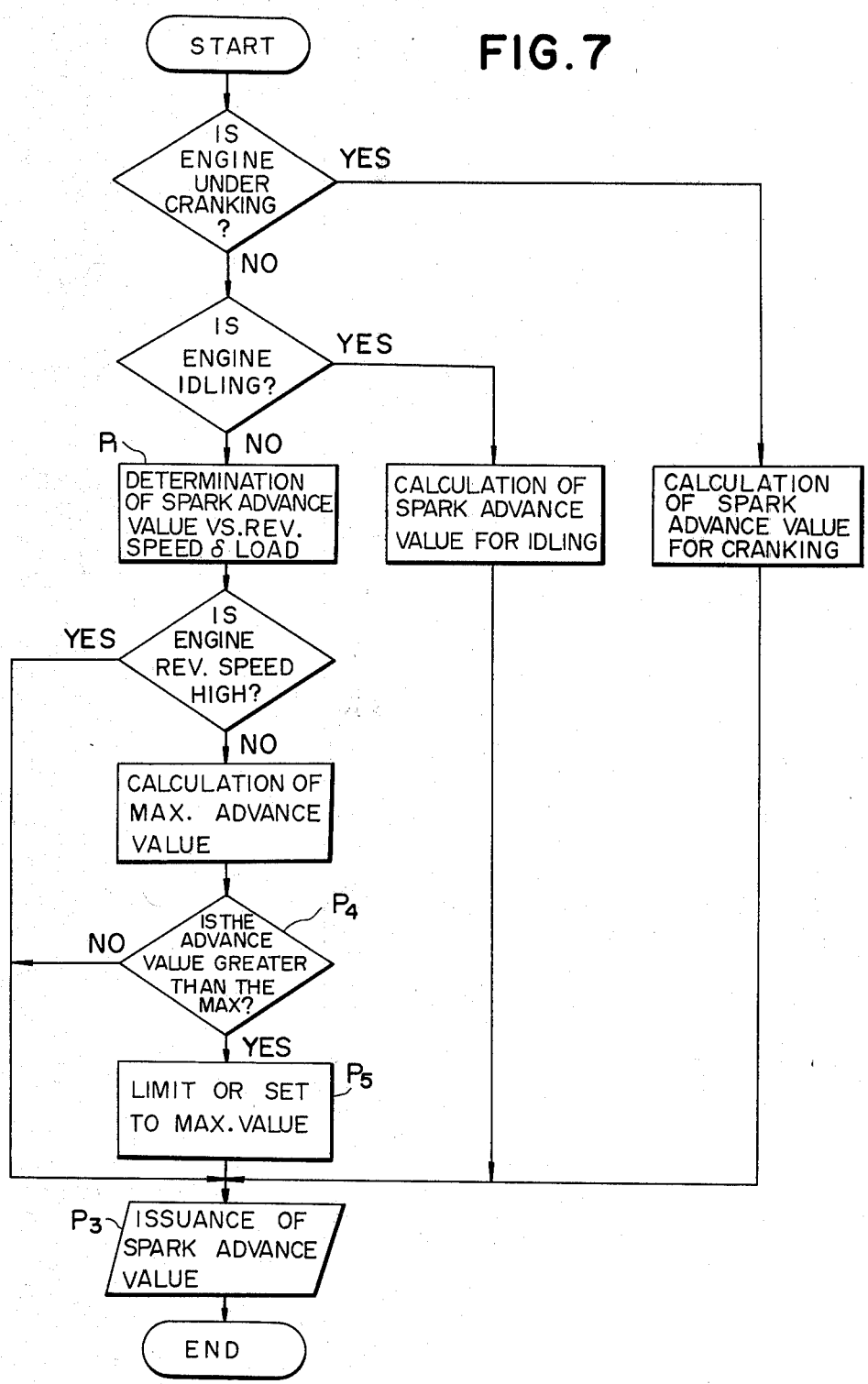
FIG. 7 is a flow chart illustrative of another example of the operation of the central processor used to determine value of spark advance.

FIG. 7 is a flow chart illustrative of the operation of the central processor, showing another embodiment according to the present invention, wherein for the purpose of enhancing engine the start-up and idle stability, start-up spark advance value and the idle spark advance value which are different are provided, respectively, no correction takes place in response to temperature, and when the engine revolution speed is relatively high, temperature dependent correction will not take place for the purpose of engine protection. The maximum spark advance value for a given cylinder wall temperature is found in accordance with the characteristic curve shown in FIG. 8 by detecting the cylinder wall temperature as a temperature representing the engine state. A comparison is made, in step P4 of FIG. 7, between the maximum spark advance value and the basic spark advance value which has been found, in step P1, based on engine revolution speed and load. This comparison will produce the basic spark advance value via step P3 when the basic spark advance value is smaller than maximum spark advance value or produce a maximum spark advance value via step P3 when the basic spark advance value is greater than the maximum spark advance value because in step P5 the basic advance value is limited to the level of maximum spark advance value. In FIG. 8 the axis of abscissa designates the cylinder wall temperature, while the axis of ordinate illustrates the maximum spark advance values.

This control system is advantageous in output performance of and protection of the engine because during a range in the vicinity of a fully opened position of throttle valve when spark advance values are relatively small, substantially no correction of the spark advance value takes place. Referring to FIG. 8, the reason why maximum spark advance values are smaller within the engine warm-up period than after the warm-up period is to reduce air pollution by promoting a rise in exhaust temperature, accelerating engine warm-up and facilitating effective operation of an exhaust gas purifier. The reason why the maximum spark advance values rise again during low engine temperature range is to solve the problem that if the spark advance values are made excessively small during a low engine temperature range, incomplete combustion takes place, causing a great amount of emission of unburnt hydrocarbon (HC) and worsening driveability.

It will now be understood from the preceding description that according to the present invention the optimum spark advance value for every state of the engine warm-up period can be provided because of the construction that the spark advance value is corrected in accordance with the warm-up state of the engine, and as a result the optimum spark timing control with respect to emission control, fuel economy and engine protection can be carried out.

In addition to the common effect as mentioned above, the following effects are noted according to the embodiments, respectively. That is, since a digital type processing unit is employed, a correction coefficient can be set precisely and accurately in correspondance with any temperature instead of approximation with a straight line or a bent line, and the input signals are in common use with the signals used in an electronic fuel injection control and an exhaust gas recirculation control so that the system can be constructed and arranged with little cost increase. According to a system wherein a spark advance value is limited by an allowable upper bound value, engine protection capability is enhanced, and according to a system wherein a spark advance value is smaller in degrees within a warm-up period than after warm-up, the time required for warm-up is shortened thus reducing emissions causing air contamination.

In the practice of the invention, the inventor has used a Hitachi Model No. HD 46802 central processor. A Hitachi Model No. HD 46506 input-output control unit compatible with the processor has been used.

The start switch is entirely conventional and may be a pair of contacts which are closed while the engine starter motor is in operation.

The basic angle sensor and unit angle sensor are also conventional and may be in the form of a detecting unit 24 described in U.S. Pat. No. 4,015,565, filed Apr. 5, 1977 in the name of Aono et al. and entitled "SPARK-ADVANCE CONROL APPARATUS FOR INTERNAL COMBUSTION ENGINE" (which is herein incorporated by reference or may be in the form of a speed-electrical transducer 10 described in U.S. Pat. No. 3,853,103, filed Dec. 10, 1974 in the name of Wahl et al. (assignee: Robert Bosch GmbH) and entitled "IGNITION TIMING CONTROL SYSTEM FOR INTERNAL COMBUSTION ENGINE IGNITION SYSTEMS", which is incorporated herein by reference.

A way to find or sense the revolution speed of the engine, i.e., engine rpm, based upon a signal from the unit angle sensor is conventional and described in the above-mentioned U.S. Pat. No. 3,853,103. In this respect, reference is made to U.S. Pat. No. 3,969,614, filed July 13, 1976 in the name of Moyer et al. and entitled "METHOD AND APPARATUS FOR ENGINE CONTROL" and reference is also made to U.S. Pat. No. 4,009,699, filed Mar. 1, 1977 in the name of Hetzler et al. and entitled "DIGITAL IGNITION SPARK TIMING ANGLE CONTROL WITH READ ONLY MEMORY."

The inventor has used a breakerless ignition system employing an ignition coil and a power transistor.

A way to determine the instance of ignition based upon binary signals of the basic angle sensor and unit angle sensor is disclosed in U.S. Pat. No. 3,853,103 in the name of Wahl et al. and U.S. Pat. No. 4,015,565 in the name of Aono et al.

In a four-cylinder, four-cycle internal combustion engine, each one ignition pulse must be obtained after each revolution of the crank shaft by 180°; i.e. at 180° after the first ignition pulse is derived, a second basic angle pulse must then be provided by the basic angle sensor. In this case, the basic angle sensor must be designed to provide a basic angle pulse after each revolution of the crank shaft by 180°.

In a six-cylinder, four-cycle internal combustion engine, each one ignition pulse must be obtained after each revolution of the crank shaft by 120°; i.e. at 120° after the first ignition pulse is derived, a second basic angle pulse must then be provided by the basic angle sensor. In this case, the basic angle sensor must be designed to provide a basic angle pulse after each revolution of the crank shaft by 120°.

What is claimed is:

1. A method for the control of an ignition system spark timing for a spark ignition internal combustion engine, said method comprising the steps of:
 sensing engine temperature of the engine; and
 correcting a value of spark advance that is determined by calculation based upon engine operating parameters excluding the sensed engine temperature in accordance with the sensed engine temperature, said correcting step including the steps of:

finding by table look-up in a read only memory a correction coefficient for the sensed engine temperature, said read only memory having a plurality of correction coefficient values and a plurality of corresponding engine temperature values stored therein which values define a two dimensional table having a first zone wherein the value of the correction coefficient remains constant with increase of temperature, a second and subsequent zone in which the value of the correction coefficient decreases proportionally with respect to increase in temperature, a third and subsequent zone in which the value of the correction coefficient remains constant with increase in temperature, a fourth and subsequent zone in which the value of the correction coefficient increases to a level equal to the level at which the correction values remain constant in said first zone and a fifth and subsequent zone in which the values of said correction coefficient remain constant with increase of temperature;

multiplying the value of spark advance that is determined by calculation based upon engine operating parameters excluding the sensed engine temperature with said coefficient to provide a result; and providing said result as an output value of spark advance.

2. An apparatus for the control of an ignition system spark timing for a spark ignition internal combustion engine, said apparatus comprising:

an engine temperature sensor for providing an output representative of the engine temperature;

a processor which corrects the value of spark advance that is determined by calculation based upon engine operating parameters excluding the engine temperature in accordance with said output of said engine temperature sensor;

a read only memory integrated with said processor, said read only memory having a plurality of correction coefficient values and a plurality of corresponding engine temperature values stored therein which values define a two dimensional table having a first zone wherein the value of the correction coefficient remains constant with increase of temperature, a second and subsequent zone in which the value of the correction coefficient decreases proportionally with respect to increase in temperature, a third and subsequent zone in which the value of the correction coefficient remains constant with increase in temperature, a fourth and subsequent zone in which the value of the correction coefficient increases to a level equal to the level at which the correction values remain constant in said first zone and a fifth and subsequent zone in which the values of said correction coefficient remain constant with increase of temperature;

said processor (a) finding by table look-up in said read only memory a correction coefficient for said sensed engine temperature by said engine temperature sensor, (b) multiplying the value of spark advance that is determined by calculation based upon engine operating parameters excluding the sensed engine temperature with said correction coefficient to provide a result, and (c) providing said result as an output value of spark advance.

3. A method for the control of an ignition system spark timing for a spark ignition internal combustion engine, said method comprising the steps of:

sensing engine temperature of the engine; and correcting a value of spark advance that is determined by calculation based upon engine operating parameters excluding the sensed engine temperature in accordance with the sensed engine temperature, said correcting step including the steps of:

finding by calculation or table look-up a value of maximum spark advance for the sensed engine temperature;

comparing said value of spark advance that is determined by calculation based upon the engine operating parameters excluding the sensed engine temperature with said value of maximum spark advance; and when the value of spark advance that is determined by calculation based upon the engine operating parameters excluding the sensed engine temperature is greater than said value of maximum spark advance, providing said value of maximum spark advance as an output value of spark advance.

4. An apparatus for the control of an ignition system spark timing for a spark ignition internal combustion engine, said apparatus comprising:

an engine temperature sensor for providing an output representative of the engine temperature;

a processor which corrects the value of spark advance that is determined by calculation based upon engine operating parameters excluding the engine temperature in accordance with said output of said engine temperature sensor, wherein said processor finds by calculation or table look-up a value of maximum spark advance for the sensed engine temperature, and compares the value of spark advance that is determined by calculation based upon the engine operating parameters excluding the sensed engine temperature with said value of maximum spark advance.

* * * * *